(12) United States Patent
Welsh et al.

(10) Patent No.: US 10,745,116 B2
(45) Date of Patent: Aug. 18, 2020

(54) ANTI-VIBRATION LOAD GENERATING AIRCRAFT ACTUATION SYSTEM

(71) Applicant: Sikorsky Aircraft Corporation, Stratford, CT (US)

(72) Inventors: William A. Welsh, North Haven, CT (US); Bryan Kenneth Baskin, Arlington, TX (US); Chris Paul Butler, Frisco, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 453 days.

(21) Appl. No.: 15/501,240

(22) PCT Filed: Aug. 5, 2015

(86) PCT No.: PCT/US2015/043793
§ 371 (c)(1),
(2) Date: Feb. 2, 2017

(87) PCT Pub. No.: WO2016/022672
PCT Pub. Date: Feb. 11, 2016

(65) Prior Publication Data
US 2017/0225774 A1    Aug. 10, 2017

Related U.S. Application Data

(60) Provisional application No. 62/034,586, filed on Aug. 7, 2014.

(51) Int. Cl.
*B64C 27/00* (2006.01)
*B64C 27/10* (2006.01)

(52) U.S. Cl.
CPC ........... *B64C 27/001* (2013.01); *B64C 27/10* (2013.01); *B64C 2027/002* (2013.01); *B64C 2027/004* (2013.01)

(58) Field of Classification Search
CPC . B64C 27/001; B64C 27/10; B64C 2027/002; B64C 2027/004; B64C 11/08
See application file for complete search history.

(56) References Cited

U.S. PATENT DOCUMENTS 4,458,862 A    7/1984    Mouille et al.
5,219,143 A *  6/1993    Staple .................. B64C 27/001
                                             244/17.11
(Continued)

FOREIGN PATENT DOCUMENTS

EP    0501658 A1    9/1992

OTHER PUBLICATIONS

PCT ISR/WO, Issued Oct. 26, 2015, PCT application No. PCT/US15/43793, 12 pages.

(Continued)

*Primary Examiner* — Philip J Bonzell
*Assistant Examiner* — Tye William Abell
(74) *Attorney, Agent, or Firm* — Cantor Colburn LLP

(57) ABSTRACT

An aircraft is provided and includes a rotor, which is rotatable relative to an airframe, a rotor, which is rotatable relative to the airframe and which generates a rotor induced vibration, an engine to generate rotational energy, a drive portion to transfer the rotational energy from the engine, a gearbox disposed to transmit the rotational energy from the drive portion to the rotor to drive rotor rotation, support members connecting the gearbox to the airframe and an actuation system configured to generate an anti-vibration load applicable to the gearbox via an actuator comprising an actuator element disposed along one of the support members and a stinger element extending from the actuator element to a connection point of the support member and the gearbox to transmit a portion of the anti-vibration load from the (Continued)

actuator element to the connection point to counter the rotor induced vibration at the gearbox.

17 Claims, 4 Drawing Sheets

(56) References Cited

U.S. PATENT DOCUMENTS

| | | | | |
|---|---|---|---|---|
| 5,230,407 A * | 7/1993 | Smith | ................... | B64C 27/001 188/281 |
| 5,269,489 A * | 12/1993 | West | ..................... | B64C 27/001 188/266.1 |
| 5,310,137 A | 5/1994 | Yoerkie, Jr. et al. | | |
| 5,316,240 A * | 5/1994 | Girard | ................... | B64C 27/001 188/380 |
| 5,332,072 A | 7/1994 | Crannage | | |
| 6,145,785 A * | 11/2000 | Certain | ................ | B64C 27/001 244/17.27 |
| 6,283,408 B1 * | 9/2001 | Ferullo | ................ | B64C 27/001 244/17.27 |
| 7,247,974 B2 | 7/2007 | Bansermir et al. | | |
| 8,037,981 B1 | 10/2011 | Bebesel et al. | | |
| 2002/0128072 A1 * | 9/2002 | Terpay | ................... | B64C 27/001 464/1 |
| 2008/0142633 A1 * | 6/2008 | McGuire | ............... | B64C 27/001 244/17.27 |
| 2009/0321556 A1 * | 12/2009 | Pancotti | ................ | B64C 27/001 244/17.27 |
| 2010/0090055 A1 * | 4/2010 | Smith | ..................... | B64C 27/12 244/17.27 |
| 2012/0292434 A1 | 11/2012 | Welsh | | |
| 2012/0298794 A1 * | 11/2012 | Krysinski | ............. | B64C 27/001 244/17.27 |
| 2015/0139800 A1 * | 5/2015 | Hendricks | ............ | B64C 27/001 416/134 A |

OTHER PUBLICATIONS

Extended European Search Report; European Application No. 15830342.0; dated Feb. 16, 2018; 9 Pages.

* cited by examiner

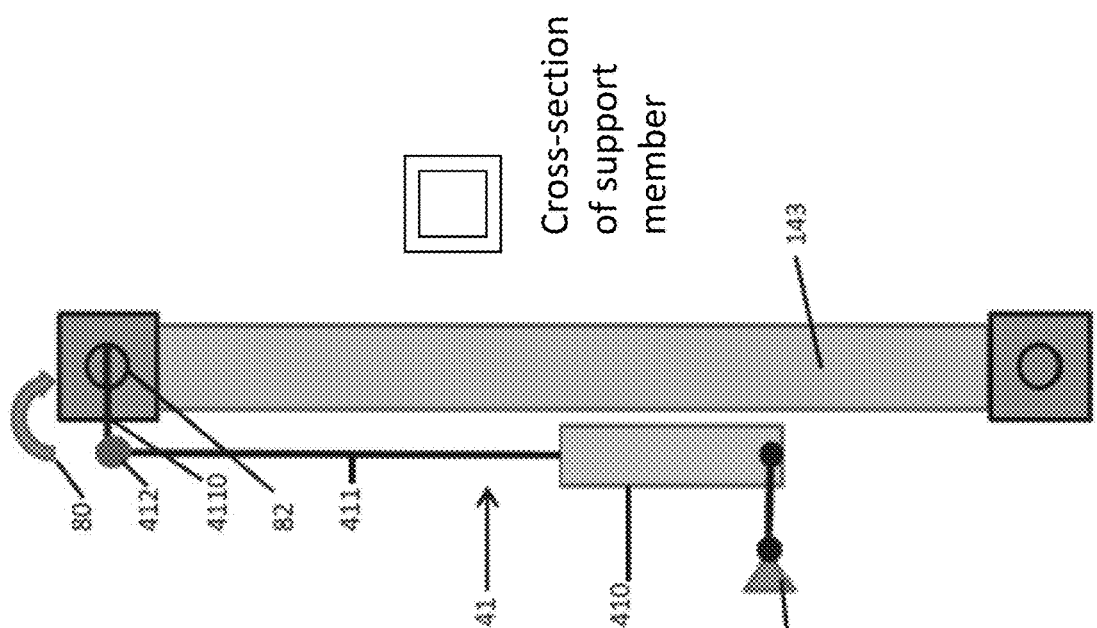
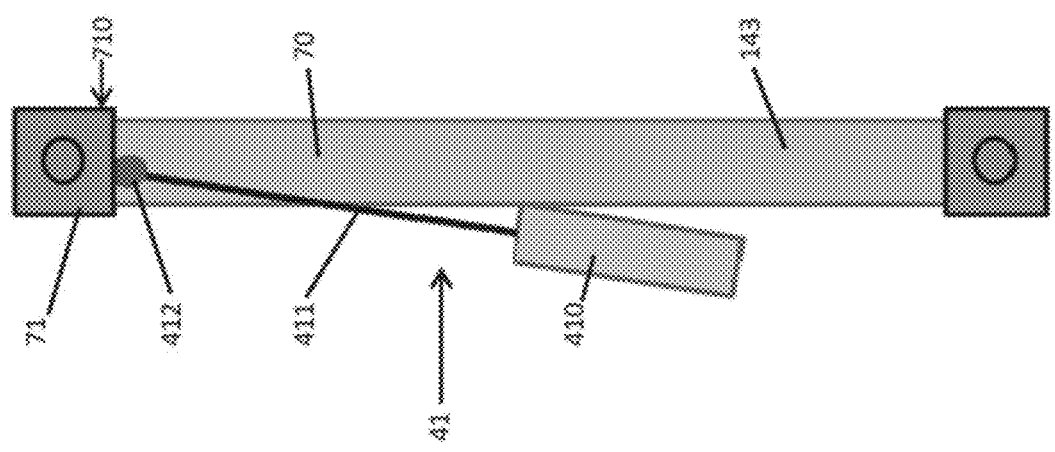
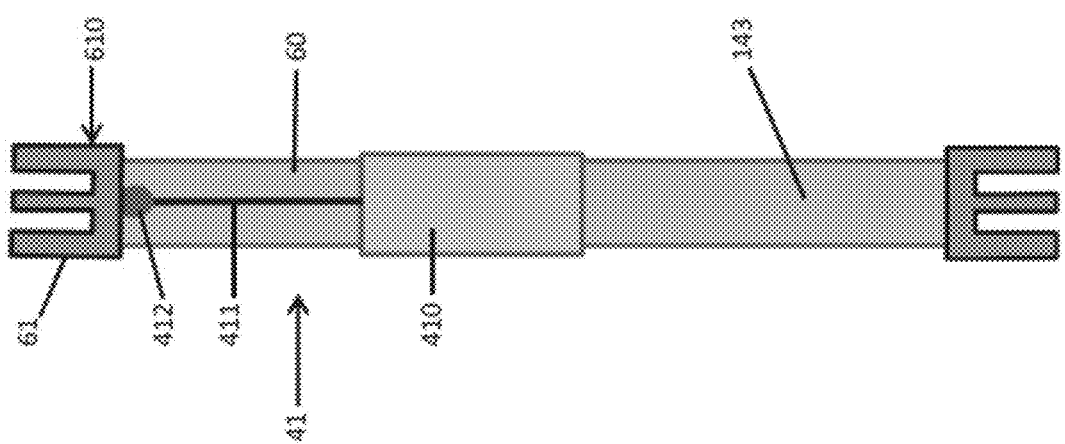

ANTI-VIBRATION LOAD GENERATING AIRCRAFT ACTUATION SYSTEM

This application claims the benefit of PCT Application No. PCT/US15/43793, filed on Aug. 5, 2015, which in turn claims priority to U.S. provisional patent application Ser. No. 62/034,586, filed Aug. 7, 2014. The entire contents of PCT Application No. PCT/US15/43793 and U.S. Provisional Patent Application No. 62/034,586 are incorporated herein by reference.

BACKGROUND OF THE INVENTION

The subject matter disclosed herein relates to an anti-vibration load generating aircraft actuation system and, more particularly, to an aircraft actuation system including single-point actuators configured to generate an anti-vibration load applicable to a gearbox to counter rotor induced vibration.

An aircraft, such as a helicopter, typically includes an airframe with a top portion at which a main rotor apparatus is rotatably supported and a tail portion at which a tail rotor apparatus is rotatably supported. The aircraft may further include a drive portion that drives rotation of main and tail rotors for flight operations. This rotation generates vibratory loads that are transmitted to the airframe and can cause discomfort to pilots, crewmen and passengers as well as damage.

BRIEF DESCRIPTION OF THE INVENTION

According to one aspect of the invention, an aircraft is provided and includes a rotor, which is rotatable relative to an airframe, a rotor, which is rotatable relative to the airframe and which generates a rotor induced vibration, an engine to generate rotational energy, a drive portion to transfer the rotational energy from the engine, a gearbox disposed to transmit the rotational energy from the drive portion to the rotor to drive rotor rotation, support members connecting the gearbox to the airframe and an actuation system configured to generate an anti-vibration load applicable to the gearbox via an actuator comprising an actuator element disposed along one of the support members and a stinger element extending from the actuator element to a connection point of the support member and the gearbox to transmit a portion of the anti-vibration load from the actuator element to the connection point to counter the rotor induced vibration at the gearbox.

In accordance with additional or alternative embodiments, the actuator comprises a single-point actuator and the actuation system includes six single-point actuators respectively associated with one or more support members.

In accordance with additional or alternative embodiments, at least one or more single-point actuators produce a corresponding portion of the anti-vibration load in a single direction.

In accordance with additional or alternative embodiments, at least one or more single-point actuators produce a corresponding portion of the anti-vibration load in multiple directions.

In accordance with additional or alternative embodiments, at least one or more single-point actuators apply a corresponding portion of the anti-vibration load to the gearbox directly.

In accordance with additional or alternative embodiments, at least one or more single-point actuators apply a corresponding portion of the anti-vibration load to a corresponding support member.

In accordance with additional or alternative embodiments, at least one or more of the support members includes a tubular cross-section with a single-point actuator disposed therein.

In accordance with additional or alternative embodiments, at least one or more of the support members includes a beam-shaped cross-section with a single-point actuator disposed adjacent to support member.

In accordance with additional or alternative embodiments, at least one or more of the support members includes a joint having more than one degree of freedom.

According to yet another aspect of the invention, an actuatable gearbox support system of an aircraft is provided. The aircraft includes a gearbox disposed to transmit rotational energy from a drive portion to a rotor, which is rotatable relative to an airframe and which generates rotor induced vibration. The support system includes support members by which the gearbox is disposed on the airframe and single-point actuators connected to the support members at corresponding attachment points and configured to generate an anti-vibration load applicable to the gearbox via the attachment points and which counter the rotor induced vibration.

In accordance with additional or alternative embodiments, the single-point actuators are provided in a group of six single-point actuators respectively associated with one or more support members.

In accordance with additional or alternative embodiments, at least one or more single-point actuator produces a portion of the anti-vibration load in a single direction or in multiple directions.

In accordance with additional or alternative embodiments, at least one or more single-point actuator applies a portion of the anti-vibration load to the gearbox directly or to a corresponding support member.

In accordance with additional or alternative embodiments, at least one or more of the support members includes a tubular cross-section with a corresponding one of the single-point actuators disposed therein or a beam-shaped cross-section with a corresponding one of the single-point actuators disposed adjacent to support member.

In accordance with additional or alternative embodiments, at least one or more of the support members includes a joint having more than one degree of freedom.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a schematic view of a support member and a single-point actuator in accordance with alternative embodiments;

FIG. 6 is a schematic view of a support member and a single-point actuator in accordance with alternative embodiments; and FIG. 7 is a schematic view of a support member and a single-point actuator in accordance with alternative embodiments.

The detailed description explains embodiments of the invention, together with advantages and features, by way of example with reference to the drawings.

DETAILED DESCRIPTION OF THE INVENTION

As will be described below, vibration from main rotor(s) of an aircraft is transmitted to the fuselage and engine(s) and passengers via the main transmission. Nullifying the main transmission motion will cause vibration throughout the aircraft to be dramatically reduced thus improving aircraft reliability and passenger comfort. To achieve this, single-point actuators that incorporate an oscillating proof mass are attached to the main transmission or, alternatively, to the support members of the main transmission. In either case, anti-vibration loads created by the single-point actuators can be applied to the main transmission.

Figure 1:
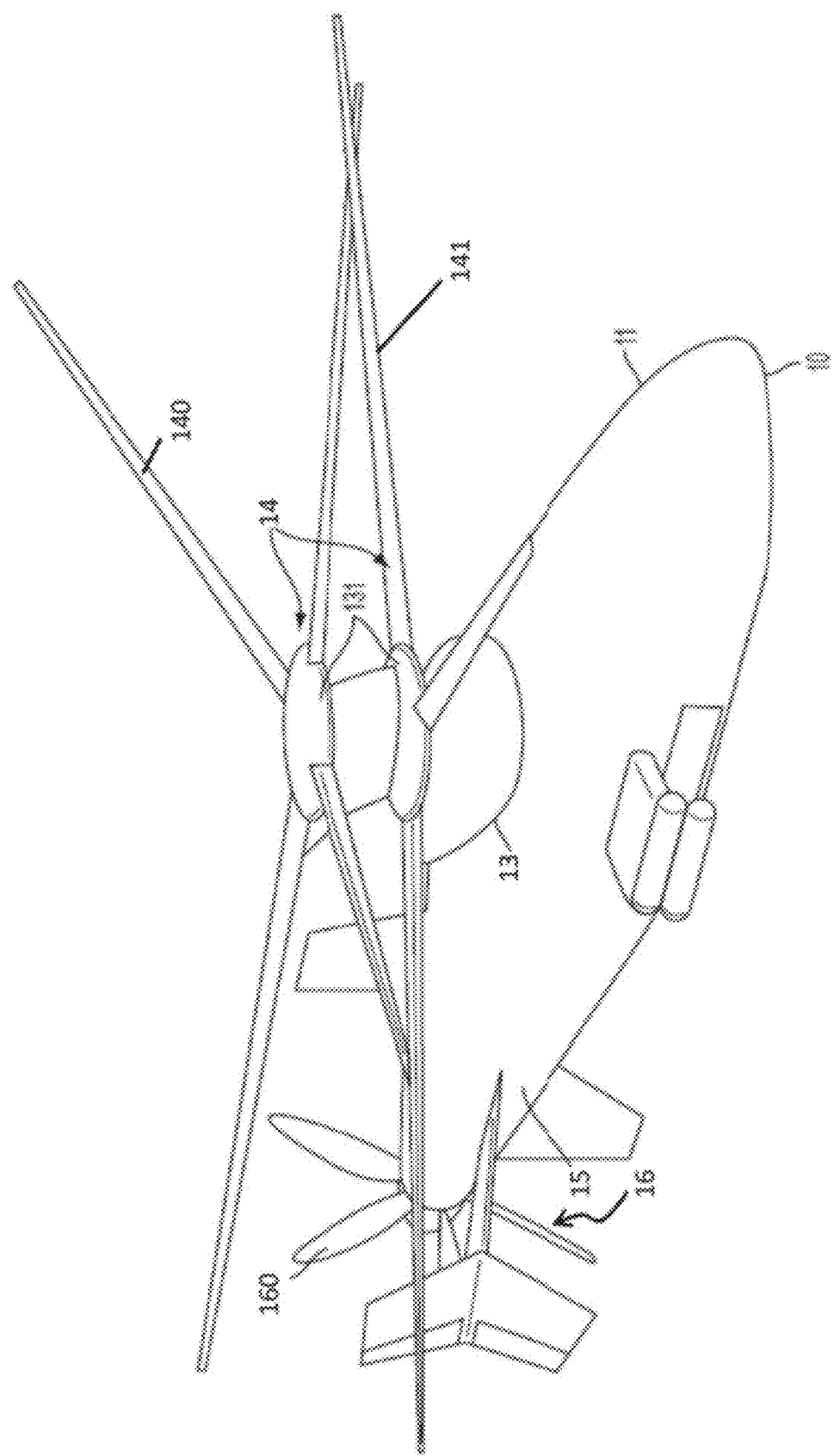
FIG. 1 is a perspective view of an aircraft in accordance with embodiments.
Figure 2:
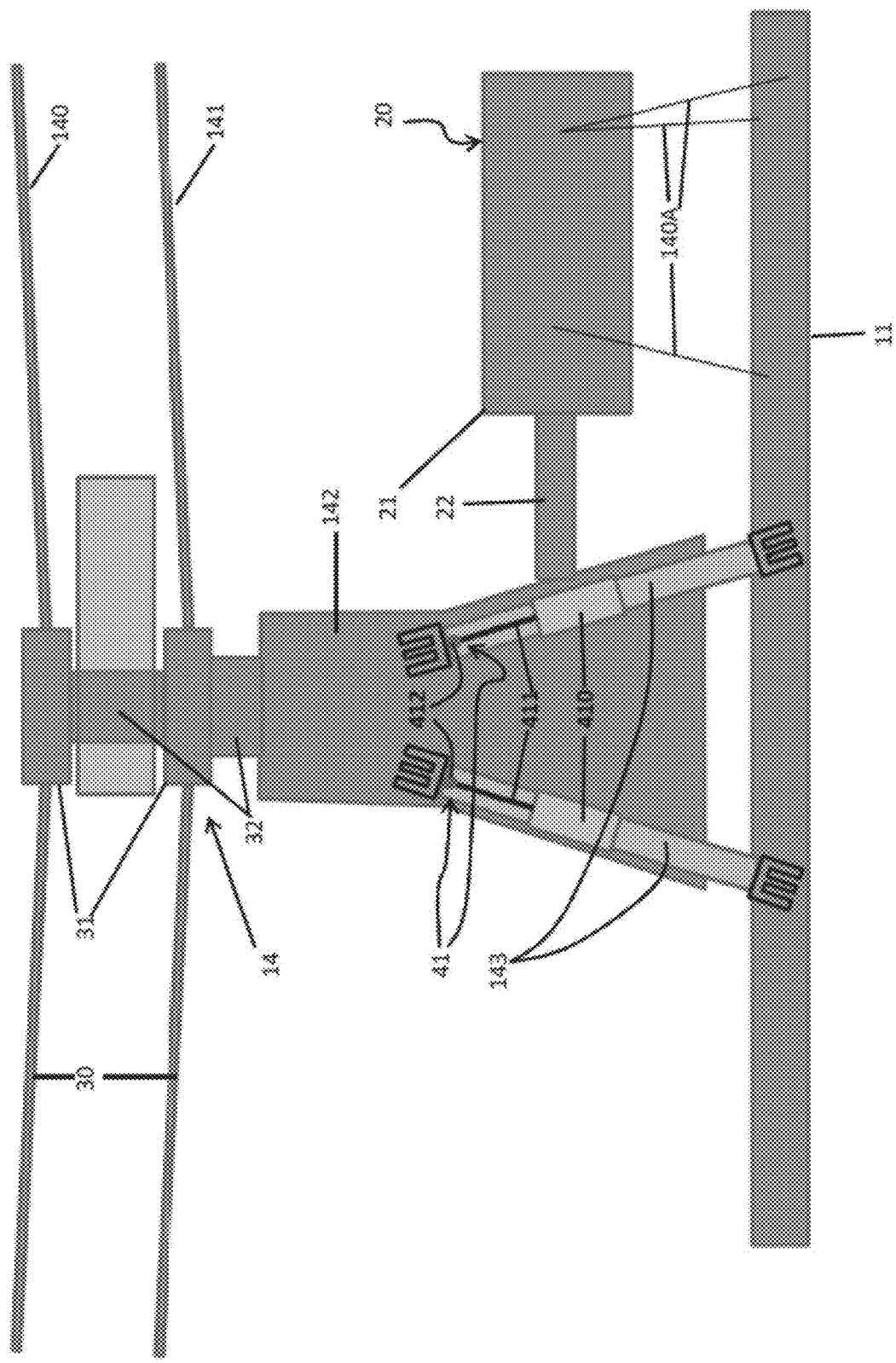
FIG. 2 is a side schematic view of an upper portion of the aircraft of FIG. 1 in accordance with embodiments.

With reference to FIGS. 1 and 2, an aircraft 10 is provided. The aircraft 10 includes an airframe 11 formed to define a cabin in which a pilot and, in some cases, a crew and passengers are accommodated, and housing a flight computer 12 (see FIG. 3). The airframe 11 includes a top portion 13 at which a main rotor apparatus 14 is rotatably supported and a tail portion 15 at which a tail rotor apparatus 16 is rotatably supported. In accordance with embodiments and, as shown in FIG. 1, the aircraft 10 may be configured as a coaxial, counter-rotating helicopter with the main rotor apparatus 14 including coaxial, counter rotating rotors 140 and 141, a gearbox 142 and support members 143, as shown in FIG. 2, and the tail rotor apparatus 16 including a propeller 160. However, it is to be understood that this is merely exemplary and that the description provided below is applicable to other configurations of the aircraft 10, including, by way of example, fixed wing aircraft and conventional single rotor aircraft.

As shown in FIG. 2, the aircraft 10 further includes a drive portion 20 including an engine 21 and a drive shaft 22. The engine 21 is configured to generate rotational energy, which is transmitted to the gearbox 142 by the drive shaft 22. The gearbox 142 then transmits the rotational energy to the coaxial, counter rotating rotors 140 and 141 to thereby drive rotation of the coaxial, counter rotating rotors 140 and 141 relative to the airframe 11. The main rotor apparatus 14 and the drive portion 20 may both be disposed at or near the top portion 13 of the airframe 11 with at least the gearbox 142 being supportively disposed on the airframe 11 at or near the top portion 13 by the support members 143. The support members 143 serve to secure the main rotor apparatus 14 to the airframe 11 in opposition to the steady lifting loads generated by the rotation of and lift loads produced by the coaxial, counter rotating rotors 140 and 141.

Each of the coaxial, counter rotating rotors 140 and 141 includes a set of blades 30 that extend outwardly from a blade retention hub 31. The blade retention hubs 31 are each coupled to the gearbox 142 via rotor shafts 32. As the coaxial, counter rotating rotors 140 and 141 rotate, the blades 30 generate steady (i.e., the steady lifting loads noted above) and vibratory loads that are transmitted through the blade retention hubs 31 to the rotor shafts 32 and into the gearbox 142. From the gearbox 142, the steady and vibratory loads are transmitted via the support members 143 into the fuselage of the airframe 11. Other vibratory loads can be transmitted from the gearbox 142 through the drive shaft 22 and into the engine 21. From the engine 21, these other vibratory loads can be transmitted to the fuselage of the airframe 11 through engine supports 140A. The vibratory portion of the loads generated by the main rotor apparatus 14 may thus lead to vibration in the airframe 11 and the engine 21 causing fatigue to the pilot and any crew or passengers as well as possible damage to equipment mounted in the fuselage of the airframe 11.

Figure 4:
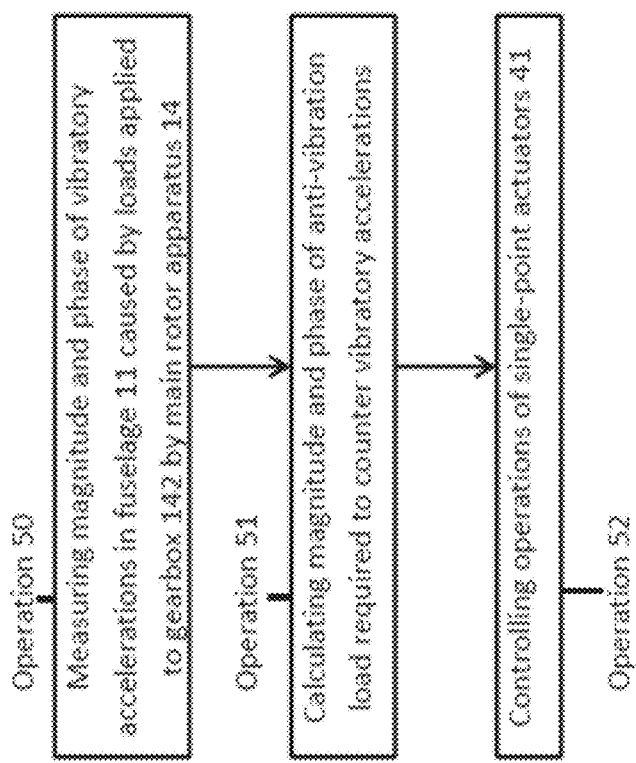
FIG. 4 is a flow diagram illustrating a method of controlling the actuation system of FIG. 3 in accordance with embodiments.
Figure 3:
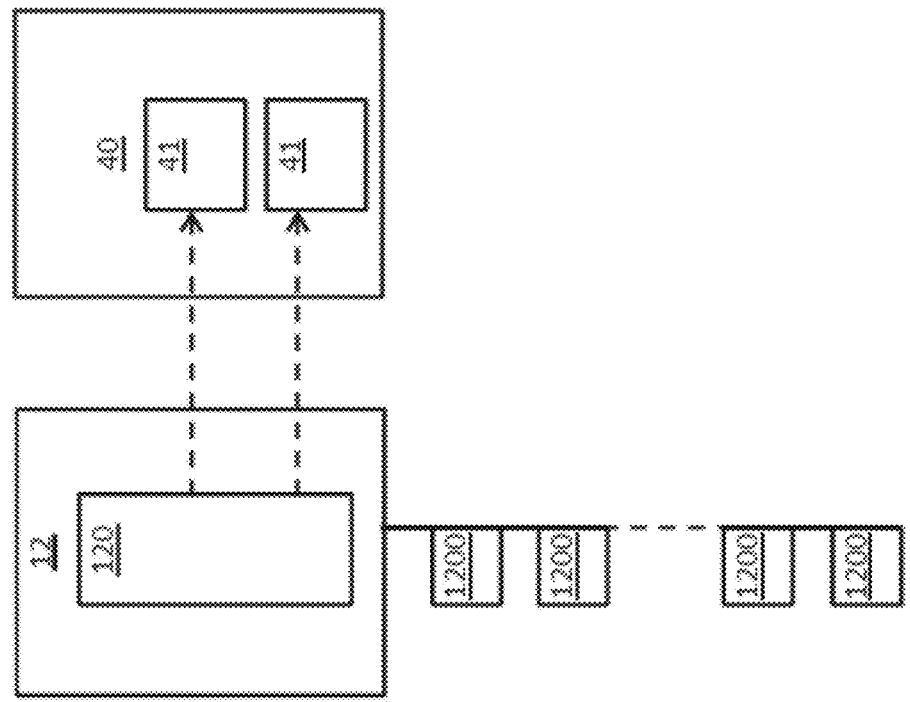
FIG. 3 is a schematic diagram of an actuation system of the aircraft of FIGS. 1 and 2 in accordance with embodiments.

With continued reference to FIG. 2 and with additional reference to FIGS. 3 and 4, the aircraft 10 further includes an actuation system 40. The actuation system 40 is operably coupled to a vibration control computer 120 and includes single-point actuators 41. The single-point actuators 41 are configured to generate an anti-vibration load that is applicable to the gearbox 142 to counter vibratory portion of the loads generated by rotation of the coaxial, counter rotating rotors 140 and 141 of the main rotor apparatus 14. The vibration control computer 120 identifies the presence and direction of the vibratory portion of the loads being applied to the gearbox 142 and controls operations of the single-point actuators 41 accordingly.

As shown in FIGS. 3 and 4, during flight operations of the aircraft 10, the vibration control computer 120 of the flight computer 12 senses or otherwise measures the magnitude and phase of the vibratory accelerations in the fuselage 11 caused by loads applied to the gearbox 142 by the main rotor apparatus 14 due to the sum loads originating from the coaxial, counter-rotating rotors 140 and 141 (operation 50). These accelerations may be sensed or detected by a series of accelerometers 1200 coupled to the vibration control computer 120 and disposed in or about the fuselage 11. The vibration control computer 120 then calculates a magnitude and phase of the anti-vibration load required to counter the accelerations in the fuselage (operation 51) and controls operations of the single-point actuators 41 accordingly (operation 52). The vibration control computer 120 may further determine whether vibration in the airframe 11 and the engine 21 are sufficiently reduced and may adjust the control of the single-point actuators 41 if results of that determination indicate that excessive vibration remains.

In accordance with embodiments, the support members 143 may be provided in a group of at least 6 support members 143 or as a mixture of support members 143 and other types of support elements, such as plates. In any case, the support members 143 may be disposed to restrain the gearbox 142 in six directions respectively associated with six degrees of freedom. Where the support members 143 are provided in a group of six, the single-point actuators 41 may also be provided in a group of six single-point actuators 41. However, it is to be understood that the number of the support members 143 and the number of the single-point actuators 41 need not be the same and each could be more or less than six.

In accordance with further embodiments, the vibratory loads applied to the gearbox 142 by the rotation of the coaxial, counter rotating rotors 140 and 141 of the main rotor apparatus 14 are countered by the single-point actuators 41 under the controls described above. In particular, the single-point actuators 41 are configured to produce anti-vibration loads that act at corresponding single points on the gearbox 142 and are not generated as a result of equal and opposite loads as would be created by a typical hydraulic ram type actuator. At least one or more of the single-point actuators 41 may be configured to produce a corresponding portion of the anti-vibration loads in a single direction. Alternatively, at least one or more of the single-point actuators 41 may be configured to produce a corresponding portion of the anti-vibration loads in a multiple directions. This corresponding portion of the anti-vibration loads may be referred to as a single-point load and can be created by oscillating an inertia or "proof mass" at a desired amplitude, phase and frequency and using the resulting inertial load(s) to counteract the gearbox motions caused by the vibratory loads applied to the gearbox 142 by the main rotors 30.

In accordance with embodiments, the single-point actuators 41 may include actuator elements 410, stinger elements 411 and mounting points 412. The actuator elements 410 are each disposed along a corresponding one of the support members 143 and are operably coupled to the vibration control computer 120. The actuator elements 410 thus generate the corresponding portion of the anti-vibration loads for the given single-point actuator 41 as an axial movement of a parasitic mass at the desired amplitude, phase and frequency in accordance with instructions received from the vibration control computer 120. The stinger elements 411 are each provided as an elongate component that extends axially from an end of the corresponding actuator element 410 to the corresponding mounting point 412, which is defined as a connection point between a support member 143 and the gearbox 142 or as being a point that is proximate to such a support member-gearbox connection point. The stinger element 411 thus transmits anti-vibration loads from the actuator element 410 to the mounting point 412 and allows the actuator 41 to be positioned remotely from the gearbox 142 to avoid mechanical interferences while still applying the load to the gearbox 142 instead of the support member 143. The corresponding portion of the anti-vibration load for the given single-point actuator 41 that is generated by the actuator element 410 is transmitted through the stinger element 411 to the stinger mounting point 412.

The stinger mounting point 412 can be coupled to an end of a support member 143 such that the corresponding portion of the anti-vibration loads for the given single-point actuator 41 are applied to an upper end of the support member 143. Alternatively, the stinger mounting point 412 can be coupled to the gearbox 142 directly such that the anti-vibration loads for the given single-point actuator 41 are applied proximate to an upper end of the support member 143 and to the gearbox 142 directly. Embodiments relating to the connections of the stinger mounting point 412 will be described in greater detail below with reference to FIGS. 5-7.

As shown in FIG. 5, at least one or more of the support members 143 may include a tubular cross-section 60 and a joint element (or clevis) 61 by which the support member 143 is connected to the gearbox 142. The joint element 61 may have one or more degrees of freedom in the connection and may be provided, e.g., as a hinge-pin connection 610 (single degree of freedom) or as a ball-cuff connection (multiple degrees of freedom). In the embodiment of FIG. 5, the actuator element 410 may be disposed within or beside the tubular cross-section 60 with the stinger element 411 extending toward the joint element 61 at an end of the tubular cross-section 60 and with the stinger mounting point 412 positioned at the joint element 61.

As shown, the stinger 411 may be substantially parallel with the tubular cross section 60. The stinger load is thus applied to the gearbox 142 to suppress gearbox motions. The effect on gearbox 142 motions is not sensitive to the orientation of the stinger 411. Alternatively, as shown in FIG. 6, at least one or more of the support members 143 may include a beam-shaped (e.g., an I-beam-shaped) cross-section 70 and a joint element (or clevis) 71 by which the support member 143 is connected to the gearbox 142.

As noted above, the joint element 71 may have one or more degrees of freedom in the connection and may be provided, e.g., as a hinge-pin connection 710 (single degree of freedom) or as a ball-cuff connection (multiple degrees of freedom). In the embodiment of FIG. 6, the actuator element 410 may be disposed at an angle relative to the support member 143 and adjacent to the beam-shaped cross-section 70 with the stinger element 411 extending toward the joint element 71 at an end of the beam-shaped cross-section 70 and with the stinger mounting point 412 positioned at the joint element 71. As such, the stinger 411 may be substantially non-parallel with the cross section 70 to react vibratory loads passing substantially non-parallel with the support member 143.

In the embodiments of FIGS. 5 and 6, the corresponding portions of the anti-vibration loads from the actuator elements 410 are oriented to pass through the connection points of the joint elements 61, 71 to the gearbox 142. In accordance with alternative embodiments and, as shown in FIG. 7, however, the corresponding portion of the anti-vibration loads from an actuator element 410 can be oriented to create a moment 80. In these cases, the actuator element 410 is mounted remotely from the support member 143 in a restraint element 81 that is configured to equilibrate moment 80. Specifically, the stinger 411 has an extension 4110 between joint 82 and the stinger mounting point 412. The restraint element 81 can be mounted to, by way of example, the airframe 11 and maintains the orientation of the stinger 411 and actuator element 410 relative to the support member 143. In this manner, the stinger 411 is held apart from but substantially parallel to the support member 143, and the actuation of the actuator element 410 creates the moment 80. The restraint element 81 may be tuned such that the corresponding portion of the anti-vibration loads from the actuator element 410 is substantially reacted at the joint 82 with little, if any, reacted by the restraint 81. While shown as substantially parallel with the support member 143, it is understood that the restraint 81 could be moved relative to the stinger mounting point 412 such that the stinger 411 and actuator element 410 are substantially not parallel with the support member 143.

Further, while not shown, additional anti-vibration actuators could be applied directly to the gearbox 142 and/or to attachments between the engine 20 and the airframe 11 to further reduce vibration.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
an airframe;
a rotor, which is rotatable relative to the airframe and which generates a rotor induced vibration;
an engine to generate rotational energy;
a drive portion to transfer the rotational energy from the engine;
a gearbox disposed to transmit the rotational energy from the drive portion to the rotor to drive rotor rotation;
support members connecting the gearbox to the airframe;
an actuation system configured to generate an anti-vibration load applicable to the gearbox comprising:
a plurality of actuators, each of the plurality of actuators including: an actuator element associated with one of the support members; and
a stinger element including an elongate component extending from the actuator element to a connection point of the support member and the gearbox to transmit a portion of the anti-vibration load from the actuator element to the connection point to counter the rotor induced vibration at the gearbox; and
a vibration control computer associated with the actuation system, wherein the vibration control computer is configured to control operation of the actuator element to generate the anti-vibration load,
wherein the actuator element of at least one of the plurality of actuators is mounted external to and remotely from the support members via a restraint element, the actuator element of the at least one of the plurality of actuators being operable to create a moment.

2. The aircraft according to claim 1, wherein the restraint member is attached to the airframe.

3. The aircraft according to claim 1, wherein at least one of the plurality of actuators comprises a single-point actuator operable to apply a load to the gearbox at a single point and the plurality of actuators includes six single-point actuators respectively associated with one or more support members.

4. The aircraft according to claim 3, wherein the at least one actuator produces a corresponding portion of the anti-vibration load in a single direction.

5. The aircraft according to claim 3, wherein the at least one actuators produces a corresponding portion of the anti-vibration load in multiple directions.

6. The aircraft according to claim 3, wherein the at least one single-point actuator applies a corresponding portion of the anti-vibration load to the gearbox directly.

7. The aircraft according to claim 3, wherein at least one single-point actuator applies a corresponding portion of the anti-vibration load to a corresponding support member.

8. The aircraft according to claim 3, wherein at least one of the support members comprises a tubular cross-section and an actuator of the plurality of actuators is disposed therein.

9. The aircraft according to claim 3, wherein at least one or more of the support members comprises a beam-shaped cross-section and an actuator of the plurality of actuators is disposed adjacent to the at least one or more of the support members.

10. The aircraft according to claim 3, wherein at least one or more of the support members comprises a joint having more than one degree of freedom.

11. An actuatable gearbox support system of an aircraft comprising a gearbox disposed to transmit rotational energy from a drive portion to a rotor, which is rotatable relative to an airframe and which generates rotor induced vibration, the support system comprising:
support members by which the gearbox is disposed on the airframe; and
single-point actuators operable to apply a load at a single point, at least one of the single-point actuators being mounted via a restraint member at a position external to and remotely from the support members, the single-point actuators being connected to the support members at corresponding attachment points and configured to generate an anti-vibration load applicable to the gearbox via the attachment points and which counter the rotor induced vibration, the anti-vibration load generated by the single-point actuators being controlled in response to a command from a vibration control computer, wherein the at least one single point actuator mounted via the restraint member is operable to generate a moment applicable to the gearbox.

12. The support system according to claim 11, wherein the single-point actuators are provided in a group of six single-point actuators respectively associated with one or more support members.

13. The support system according to claim 11, wherein at least one or more single-point actuator produces a portion of the anti-vibration load in a single direction or in multiple directions.

14. The support system according to claim 11, wherein at least one or more single-point actuator applies a portion of the anti-vibration load to the gearbox directly or to a corresponding support member.

15. The support system according to claim 11, wherein at least one or more of the support members comprises a tubular cross-section with a corresponding one of the single-point actuators disposed therein or a beam-shaped cross-section with a corresponding one of the single-point actuators disposed adjacent to support member.

16. The support system according to claim 11, wherein at least one or more of the support members comprises a joint having more than one degree of freedom.

17. The support system according to claim 11, wherein the restraint member is attachable to the airframe.

* * * * *